US009721717B2

(12) United States Patent
Petzuch et al.

(10) Patent No.: US 9,721,717 B2
(45) Date of Patent: Aug. 1, 2017

(54) COIL ARRANGEMENT AND METHOD FOR CONTROLLING A COIL ARRANGEMENT

(71) Applicant: EGSTON SYSTEM ELECTRONICS EGGENBURG GMBH, Eggenburg (AT)

(72) Inventors: Martin Petzuch, Hlucin-Bobrovniky (CZ); Ernst Prand-Stritzko, Langau (AT)

(73) Assignee: EGSTON System Electronics Eggenburg GmbH, Eggenburg (AT)

( * ) Notice: Subject to any disclaimer, the term of this patent is extended or adjusted under 35 U.S.C. 154(b) by 0 days.

(21) Appl. No.: 15/125,026

(22) PCT Filed: Mar. 10, 2015

(86) PCT No.: PCT/AT2015/000036
§ 371 (c)(1),
(2) Date: Nov. 28, 2016

(87) PCT Pub. No.: WO2015/135009
PCT Pub. Date: Sep. 17, 2015

(65) Prior Publication Data
US 2017/0178785 A1    Jun. 22, 2017

(30) Foreign Application Priority Data

Mar. 10, 2014   (AT) .................................. A 169/2014

(51) Int. Cl.
*H01F 27/26*    (2006.01)
*H01F 27/24*    (2006.01)
(Continued)

(52) U.S. Cl.
CPC .............. *H01F 27/24* (2013.01); *H02M 5/12* (2013.01); *H02M 7/537* (2013.01)

(58) Field of Classification Search
CPC ....... H02M 7/003; H02M 2007/53878; H02M 2001/0064; H01F 27/263; H01F 27/26; H01F 27/22
See application file for complete search history.

(56) References Cited

U.S. PATENT DOCUMENTS 4,208,596 A * 6/1980 Popov ................. H02K 41/025
310/13
4,254,350 A * 3/1981 Miroshnichenko .. H02K 41/025
310/13
(Continued)

FOREIGN PATENT DOCUMENTS

EP    1 437 748 A2    7/2004
JP    S59 117207 A    7/1984
(Continued)

OTHER PUBLICATIONS

International Search Report issued by the European Patent Office in International Application PCT/AT2015/000036.
(Continued)

*Primary Examiner* — Harry Behm
(74) *Attorney, Agent, or Firm* — Henry M. Feiereisen, LLC

(57) ABSTRACT

A coil arrangement has at least four coil cores around which in each case a coil winding is disposed, wherein the coil cores project over the coil windings in each case with a first coil core end region and a second coil core end region, wherein the coil arrangement furthermore has a first yoke part and a second yoke part. The first and second coil core end regions of the first and second coil core are in each case disposed opposite a first yoke side face of the first or second yoke part respectively, and the first and second coil core end regions of the first and second coil core are in each case
(Continued)

disposed opposite a second yoke side face of the first or second yoke part respectively.

21 Claims, 4 Drawing Sheets

(51) Int. Cl.
 *H02M 5/12* (2006.01)
 *H02M 7/537* (2006.01)

(56) References Cited

U.S. PATENT DOCUMENTS

| | | | | |
|---|---|---|---|---|
| 2004/0017689 | A1* | 1/2004 | Zhang | H02M 5/45 363/71 |
| 2004/0257187 | A1* | 12/2004 | Drummond | H01F 27/22 336/61 |
| 2008/0297126 | A1* | 12/2008 | Nagano | H01F 27/385 323/271 |
| 2013/0234526 | A1 | 9/2013 | Jacobson et al. | |
| 2013/0307659 | A1* | 11/2013 | Johnson | H01F 27/263 336/210 |

FOREIGN PATENT DOCUMENTS

| | | |
|---|---|---|
| JP | 5 306562 B1 | 10/2013 |
| WO | WO 01/80412 A1 | 10/2001 |
| WO | WO 2008/003006 A2 | 1/2008 |

OTHER PUBLICATIONS

Jieli Li et al.: "Coupled Inductor Design Optimization for Fast-Response Low-Voltage DC-DC Converters", found in IEEE Applied Power Electronics Conference, Mar. 2002, pp.

* cited by examiner

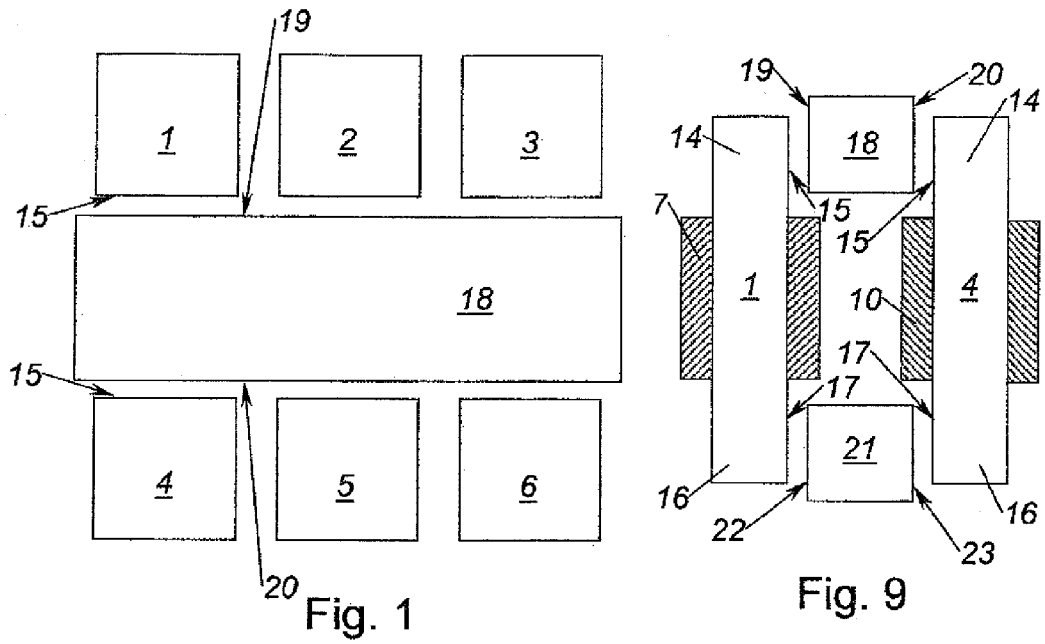
Fig. 1
Fig. 9
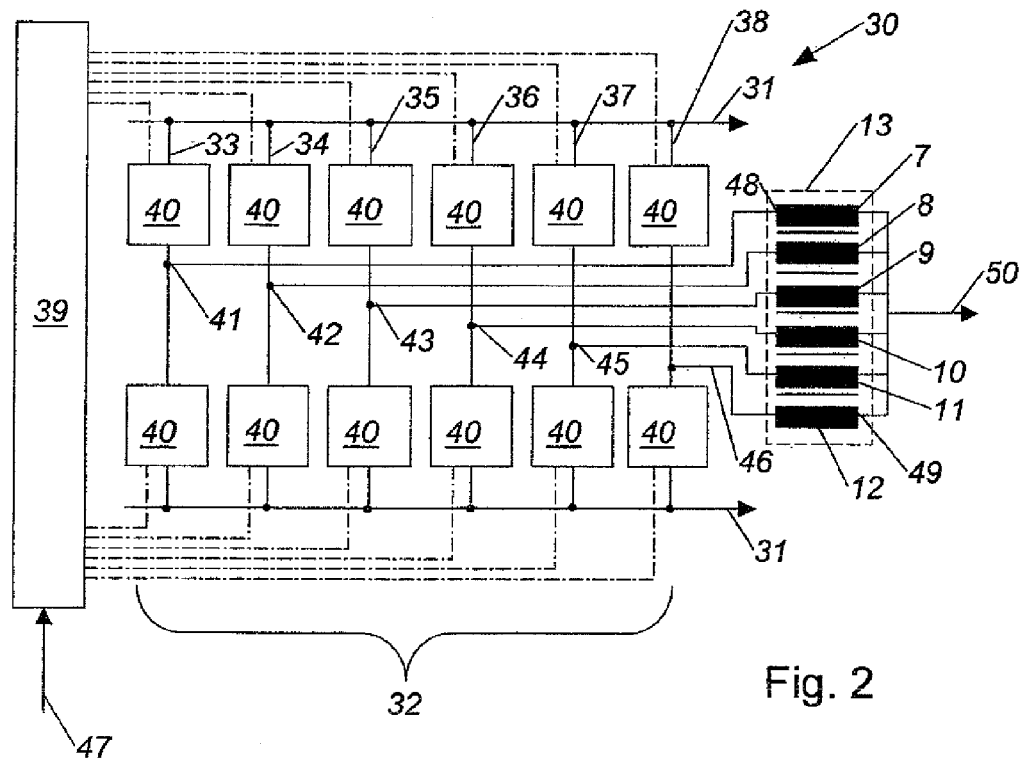
Fig. 2

COIL ARRANGEMENT AND METHOD FOR CONTROLLING A COIL ARRANGEMENT

CROSS-REFERENCES TO RELATED APPLICATIONS

This application is the U.S. National Stage of International Application No. PCT/AT2015/000036, filed Mar. 10, 2015, which designated the United States and has been published as International Publication No. WO 2015/135009 and which claims the priority of Austrian Patent Application, Serial No. A 169/2014 filed Mar. 10, 2014, pursuant to 35 U.S.C. 119(a)-(d).

BACKGROUND OF THE INVENTION

The invention relates to a coil arrangement.

Coil arrangements with multiple magnetically coupled coils or coil cores are known. Such coil arrangements are for example used in the outputs of inverters. Such known coil arrangements are usually constructed so that the coil cores are respectively arranged between two parallel yoke plates, i.e., within the space defined by the two yoke plates. While such coil arrangements have a construction which theoretically enables a good coupling of the individual coils or coil cores, it can in praxis only be produced or adjusted with high effort. For example the yoke plates require high manufacturing accuracy because the plane-parallelism of the confronting surfaces is important during their arrangement as well as the exact length of the coil cores. In addition it is difficult in such a construction to set or adjust the air gaps of the individual magnet circuits. Moreover such a construction has disadvantages in praxis regarding heat dissipation. As a result such coil arrangements are thermally limited regarding the maximal power loss.

SUMMARY OF THE INVENTION

It is therefore an object of the invention to provide a coil arrangement of the aforementioned type with which the mentioned disadvantages can be avoided, which can be produced easily and cost-effectively and which enables good heat dissipation and can be easily adjusted.

According to the invention this is achieved by the features of the coil arrangement of the corresponding independent patent claim.

This makes it possible to generate a coil arrangement with coupled coils or coil cores, which can be produced easily and which requires lower manufacturing accuracy and lower production costs. Such a coil arrangement can be ventilated or cooled easily and therefore enables a significantly more efficient use of the magnetic system. The corresponding coil arrangement therefore has a low mass. As a result of the arrangement of the coil cores laterally on the yoke parts it is possible to adjust each of the coils or each of the coil cores separately relative to the yoke parts without at the same time changing the distances of the other coil cores relative to the yoke parts. In addition the exact position of the coil cores is not very relevant, wherein the end sides do not have to be plan-parallel. Only the surface quality of the coil core end region side surfaces is relevant, which in the preferred embodiments lie in one plane. This places significantly lower demands on the production process than the production of plan-parallel end sides with an exact distance to each other. The entire construction of the coil arrangement can therefore be produced and adjusted easily.

The invention also relates to an electric device with a coil arrangement according to the invention.

The invention also relates to a method for controlling a coil arrangement according to the preamble of the corresponding independent patent claim.

Regarding the control of a corresponding coil arrangement by means of switchable half-bridges it was found that depending on the type of the control the output voltage may strongly fluctuate. Such a strong interfering signal, i.e., an interfering signal with great amplitude, has significant disadvantages regarding the entire electrical device, in particular also on the implementation of the coil arrangement. A strong interfering signal requires large cross sections of the coil cores or the yoke parts in order to prevent that the latter are driven to saturation due to the direct current portion. This increases the size of the overall construction. In addition the magnetic materials are a significant cost factor and due to the increasing rarity of certain natural materials pose an increasing environmental problem. It is also required to arrange a correspondingly large-dimensioned low pass filter on the AC current output. Such a filter not only requires a large amount of space due to large capacitors which may cause significant electro-technological problems due to parasitic inductivities and creep current, but also has a high time constant which slows the entire electrical device down with regard to the time behavior or the system has a low slew rate as a result of which also the upper limit frequency of such a known device is low, which in turn significantly limits the number of applications of such a device.

It is therefore an object of the invention to set forth a method of the aforementioned type with which the mentioned disadvantages an be avoided, which enables the construction of the coil cores with low cross section or a low requirement of core material and which enables a high upper limit frequency.

According to the invention this is achieved by the features of patent claim 21.

This enables achieving a small interfering signal or an interfering signal with low amplitude. As a result the cross sections of the coil cores can be kept small because the resulting direct current portion is small. As a result the mass as well as the costs of a correspondingly operated device can be kept small. Due to the low amount of required core material the adverse effect on the environment caused by such a device can be minimized. As a result of the low residual ripple of the output signal the dimensions of an output filter can be kept small which further supports a compact overall construction as well as a high upper limit frequency.

The dependent claims relate to further advantageous embodiments of the invention.

The subject matter set forth in the claims is herewith expressly incorporated by reference in the present specification as if verbatim recited therein.

BRIEF DESCRIPTION OF THE DRAWING

The invention is described in more detail with reference to the included drawings in which only preferred embodiments are exemplarily shown. Hereby it is shown in:

FIG. 1 a schematic plan view of a preferred arrangement with six coil cores and their arrangement relative to the yoke parts;

FIG. 2 a schematic diagram of a preferred embodiment of an electric device according to the invention;

FIG. 9 a schematic elevational view of a coil arrangement according to the invention in with coil windings in cross section.

DETAILED DESCRIPTION OF PREFERRED EMBODIMENTS

Figure 3:
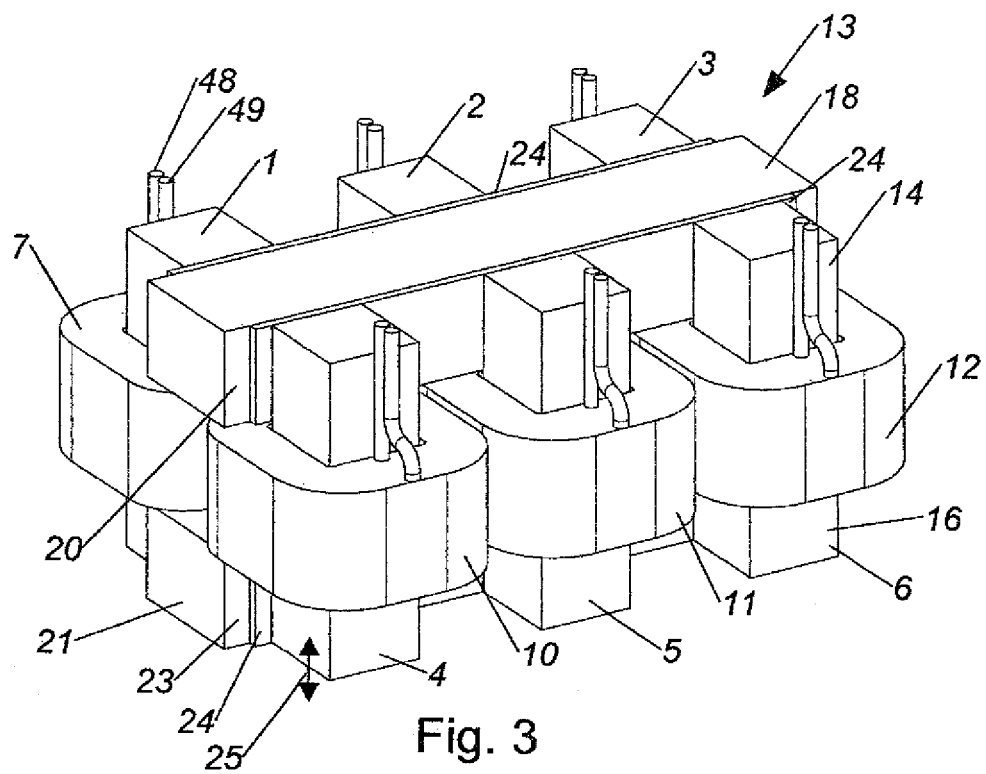
FIG. 3 a first embodiment of a coil arrangement according to the invention with six coils in axonometric representation.

FIGS. 3 to 8 each show different embodiments of a coil arrangement 13 with a first coil core 1 about which a first coil winding 7 is arranged, with a second coil core 2 about which a second coil winding 8 is arranged, with a fourth coil core 4 about which a fourth coil winding 10 is arranged and with a fifth coil core 5 about which a fifth coil winding 11 is arranged, wherein the coil cores 1, 2, 4, 5 protrude over the coil windings 7, 8, 10, 11 respectively with a first coil core end region 14 and a second coil core end region 16 which is different from the first coil core end region 14, wherein the coil arrangement 13 further has a first yoke part 18 and a second yoke part 21, wherein first coil core end region side surfaces 15 of the first coil core end regions 14 of the first coil core 1 and the second coil core 2 are respectively arranged opposite a first yoke side surface 19 of the first yoke part 18, wherein second coil core end region side surfaces 17 of the second coil core end regions 16 of the first coil core 1 and the second coil core 2 are respectively arranged opposite a first yoke side surface 22 of the second yoke part (21), wherein first coil core end region side surfaces 15 of the first coil core end regions 14 of the fourth coil core 4 and the fifth coil core 5 are respectively arranged opposite a second yoke side surface 20 of the first yoke part 18 which are different from the first yoke side surface 19, and wherein second coil core end region side surfaces 17 of the second coil core end regions 16 of the fourth coil core 4 and the fifth coil core 5 are respectively arranged opposite a second yoke side surface 23 of the second yoke part 21, which second yoke side surface is different from the first yoke side surface.

As a result a coil arrangement 13 with coupled coil windings 7, 8, 10, 11 or coil cores 1, 2, 4, 5 can be generated, which can be easily produced and which places low demands regarding manufacturing accuracy or manufacturing costs. Such a coil arrangement 13 can be easily ventilated or cooled and thus enables a significantly more efficient use of the magnetic system. The respective coil arrangement 13 has therefore a low mass. As a result of the arrangement of the coil cores 1, 2, 4, 5 laterally on the yoke parts 18, 21 is its possible to adjust each of the coil windings 7, 8, 10, 11 or each coil core 1, 2, 4, 5 separately relative to the yoke parts 18, 21 without thereby simultaneously changing the distances of the other coil cores 1, 2, 4, 5 to the yoke parts 18, 21. In addition the respective exact length of the coil cores 1, 2, 4, 5 is of little relevance, wherein the end sides do not have to be parallel. Only the surface quality of the coil core end region side surfaces 15, 17 is relevant, which in the preferred embodiments lie in one plane. This places significantly lower demands on the manufacturing process than the manufacturing of planar-parallel end sides with exact distance to each other. The entire construction of the coil arrangement 13 is therefore simple to produce and to adjust.

The present coil arrangement 13 is an arrangement of at least four coils or coil windings 7, 8, 10, 11 which each have a coil core 1, 2, 4, 5 and which are magnetically coupled by means of at least two yoke parts 18, 21. The present coil arrangement 13 is preferably provided as a starting coil arrangement of an inverter, wherein however also other applications of the same can be provided.

According to a particularly preferred embodiment it is provided that the coil arrangement 13 further has a third coil core 3 and a sixth coil core 6, wherein a third coil winding 9 is arranged about the third coil core 3, wherein a sixth coil winding 12 is arranged about the sixth coil core 6, wherein the third and the sixth coil core 3, 6 protrude over the third or sixth coil winding 9, 12 respectively by a first coil core end region 14 and a second coil core end region 16 that is different form the first coil core end region 14, that a first coil core end region side surface 15 of the first coil core end region 14 of the third coil core 3 is arranged opposite to the first yoke side surface 19 of the first yoke part 18, that a second coil core end region side surface 17 of the second coil core end region 16 of the third coil core 3 is arranged opposite to the first yoke side surface 22 of the second yoke part 21, that a first coil core end region side surface 15 of the first coil core end region 14 of the sixths coil core 6 is arranged opposite to the second yoke side surface 20 of the first yoke part 18 and that a second coil core end region side surface 17 of the second coil core end region 16 of the sixths coil core 6 is arranged opposite to the second yoke side surface 23 of the second yoke part 21. In this regard the configuration of a coil arrangement 13 with six coil cores 1, 2, 3, 4, 5, 6 and six coil windings 7, 8, 9, 10, 11, 12 have proved particularly relevant and advantageous with regard to the implementation.

The present invention is described by way of the already mentioned particularly preferred embodiments with six respective coil cores 1, 2, 3, 4, 5, 6, and six coil windings 7, 8, 9, 10, 11, 12. The present nomenclature, i.e., the designation of the individual components or structural elements is meant to facilitate simple and straightforward description of the particularly preferred embodiments with six respective coil cores 1, 2, 3, 4, 5, 6, or coil windings 7, 8, 9, 10, 11, 12. The fact that in the configuration with only four coil cores 1, 2, 4, 5, or coil windings 7, 8, 10, 11 a second coil core 2 and a fourth coil core 4 is shown does not mean a requirement for the arrangement or existence of the third coil core 3. The same applies also for the coil windings 7, 8, 9, 10, 11, 12. Therefore the selected designations of the individual components do not intended as a limitation to a coil arrangement 13 with exactly six coil cores 1, 2, 3, 4, 5, 6, and six 7, 8, 9, 10, 11, 12. Regarding the embodiment of the present invention with only four coils or coil cores the third and sixth coil core 3, 6 and the third and sixth coil winding 9, 12 are respectively omitted, if it has not been described as such already.

The individual assemblies of coil winding 7, 8, 9, 10, 11, 12 and coil core 1, 2, 3, 4, 5, 6, are preferably configured respectively substantially identical to each other, wherein this in particular refers to the electrical properties of the respective assemblies. In FIGS. 3 to 8 these assemblies are configured correspondingly identical. In the respective Figures individual parts of the respective assemblies are not provided with reference signs in all coil windings 7, 8, 9, 10, 11, 12 and coil cores 1, 2, 3, 4, 5, 6 because this would adversely affect the clarity of the corresponding Figures.

The respective assembly or arrangement has a coil core 1, 2, 3, 4, 5, 6. The coil core is preferably configured as a ferrite core or is made of other appropriate materials as they are known as magnetic core material for transformers or similar electromagnetic devices, for example layers of electric sheet metal, which is also known as transformer sheets.

The coil cores 1, 2, 3, 4, 5, 6 have preferably a substantially rectangular or square cross section wherein also other cross sectional shapes can be provided or different cross sections at different regions of the coil cores 1, 2, 3, 4, 5, 6. Preferably the coil cores 1, 2, 3, 4, 5, 6 are configured cube-shaped. Preferably also coil cores 1, 2, 3, 4, 5, 6 are provided which are configured substantially cylindrical and only have plane coil core end region side surfaces 15, 17.

On the coil cores 1, 2, 3, 4, 5, 6 or about the coil cores a respective coil winding 7, 8, 9, 10, 11, 12 or coil is arranged. The coil winding 7, 8, 9, 10, 11, 12 hereby has a predeterminable number of coils or windings of an electrical conductor, which windings are preferably arranged in multiple layers on top of each other. Particularly preferably it is provided that the coil windings 7, 8, 9, 10, 11, 12 are each made of a flat or band shaped and insulated conductor.

As shown in FIGS. 3 to 9 the coil cores 1, 2, 3, 4, 5, 6 protrude over the coil windings 7, 8, 9, 10, 11, 12 respectively at a side with a first coil core end region 14 and at the other side of the coil winding 7, 8, 9, 10, 11, 12 a second coil core end region 16 which is different from the first coil core end region 14. The coil core end regions 14, 16 are hereby the parts or regions of the coil cores 1, 2, 3, 4, 5, 6 which protrude over the coil winding 7, 8, 9, 10, 11, 12 or which are arranged outside the coil winding 7, 8, 9, 10, 11, 12.

The coil arrangement 13 has at least one first yoke part 18 and a second yoke part 21, wherein further yoke parts 26, 27 can be provided. The yoke parts 18, 21, 26, 27 serve for magnetic coupling of the coil windings 7, 8, 9, 10, 11, 12 or the coil cores 1, 2, 3, 4, 5, 6. In the present coil arrangement 13 it is provided that the coil cores 1, 2, 3, 4, 5, 6 are not arranged inside a space defined by the first and second yoke parts 18, 21 that are arranged spaced apart from each other, but rather that the coil cores 1, 2, 3, 4, 5, 6 are each laterally coupled with the first and the second yoke part 18, 21. FIGS. 1 and 9 show schematic representations of the respective arrangement in plan view or in elevational view.

The first and the second yoke part 18, 21 can be configured differently, wherein it is preferably provided that the two yoke parts 18, 21 are configured substantially identical or similar. They include ferrite or are made of electrical sheet. The same applies preferably to all further yoke parts 26, 27.

Preferably and as shown in FIGS. 3 to 9 it is provided that the first yoke part 18 and the second yoke part 21 are substantially configured cube-shaped and that the first yoke part and the second yoke part 21 are arranged relative to each other with yoke side surfaces that are substantially aligned with each other. Preferably the confronting surfaces of the two yoke parts 18, 21 are arranged parallel to each other.

The first yoke part 18 has a first yoke side surface 19 of the first yoke part 18 and a second yoke side surface 20 of the first yoke part. The first yoke side surface 19 of the first yoke part 18 is hereby arranged substantially parallel to the second yoke side surface 20 of the first yoke part 18.

The second yoke part 21 has a first yoke side surface 22 of the second yoke part 21 and a second yoke side surface 23 of the second yoke part 21. The first yoke side surface 19 of the second yoke part 21 is hereby preferably arranged substantially parallel to the second yoke side surface 23 of the second yoke part 21.

Preferably the two yoke parts 18, 21 are arranged relative to each other so that the first or the second yoke side surfaces 19, 20, 22, 23 of the two yoke parts 18, 21 are substantially aligned.

The coil core end regions 14, 16 each have a surface, which is referred to as first coil core end region side surfaces 15 of the first coil core end regions 14 and as second coil core end region side surfaces 17 of the second coil core end regions 16. The corresponding coil core end region side surfaces 15, 17 are provided for magnetic coupling with the yoke side surfaces 19, 20, 22, 23 of the first or second yoke parts 18, 21 and are correspondingly configured opposite to the regions of the yoke side surfaces 19, 20, 22, 23 for magnetic coupling to these.

In the shown preferred embodiments the yoke side surfaces 19, 20, 22, 23 are respectively configured as substantially plan or flat surfaces, correspondingly it is preferably provided that the coil core end region side surfaces 15, 17 are also configured as plan or flat surfaces. In case of a different geometry surface geometries can also be used that differ therefrom. For example it can be provided that the yoke parts 18, 21 have circular segment like recesses for coupling cylindrical coil core end region side surfaces 15, 17.

It is provided that the first coil core end region side surfaces 15 of the first coil core 1, the second coil core and the third coil core 3 are each arranged opposite the first yoke side surface 19 of the first yoke part 18 and that the second coil core end region side surfaces 17 of the first coil core 1, the second coil core 2 and the third coil core 3 are each arranged opposite the first yoke side surface 22 of the second yoke part 21.

It is also provided that the first coil core end region side surfaces 15 of the fourth coil core 4, the fifth coil core 5 and the sixth coil core 6 are each arranged opposite the second yoke side surface 20 of the first yoke part 18 and that the second coil core end region side surfaces 17 of the fourth coil core, the fifth coil core 5 and the sixth coil core 6 are each arranged opposite the second yoke side surface 23 of the second yoke part 21.

The individual coil cores 1, 2, 3, 4, 5, 6 are therefore arranged laterally on the first or the second yoke part 18, 21 and not in the space between the two yoke parts 18, 21 that are spaced apart from each other.

Preferably it is hereby provided that between the first and/or the second coil core end region side surfaces 15, 17 of the first and/or second yoke side surfaces 19, 20, 22, 23 a respective air gap and/or an insulating material plate 24 is arranged as shown in FIGS. 1 and 3 to 9. Insulating material plates 24 are conventional in order to ensure or implement a so-called air gap in a magnetic arrangement.

In the shown preferred embodiments a respective air gap or an insulating material plate 24 are arranged opposite each of the yoke side surfaces 19, 20, 22, 23. It can also be provided that an air gap or an insulating material plate 24 is only arranged on one of the yoke side surfaces 19, 20, 22, 23. Hereby it is preferably provided that for example on the first yoke part 18 the air gap is arranged or the insulating material plate 24 is arranged on the first yoke side surface 19 and that the air gap is arranged on the second yoke part 21 or the insulating material plate 24 on the second yoke side surface 23.

Preferably it is provided that the six coil cores 1, 2, 3, 4, 5, 6 are arranged in two respective rows of three coil cores 1, 2, 3, 4, 5, 6 about the two yoke parts 18, 21. Hereby it is provided that the first second and third coil core 1, 2, 3, are arranged in a first row, wherein the second coil core 2 is arranged between the first coil core 1 and the third coil core 3, and that the fourth, fifth and sixth coil core 4, 5, 6 are arranged in a second row, wherein the fourth coil core 4 is arranged opposite the first coil core 1, and wherein the fifth coil core 5 is arranged between the fourth coil core 4 and the sixth coil core 6. FIG. 1 shows a corresponding schematic representation in plan view, wherein only the coil cores 1, 2, 3, 4, 5, 6 and the first yoke art 18 are shown.

According to a not shown further embodiment it is provided to expand the described construction pairwise, in which on both sides of two yoke parts 18, 21 respective arrangements of coil cores 1, 2, 3, 4, 5, 6 and coil windings 7, 8, 9, 10, 11, 12 are arranged. It can therefore be provided that the first row has four or more coil cores 1, 2, 3, 4, 5, 6, and also that the second row has four or more coil cores 1, 2, 3, 4, 5, 6.

In general the individual coil cores 1, 2, 3, 4, 5, 6 can be arranged at different distances to each other, wherein in praxis it is advantageous that a distance between the first coil core 1 and the second coil core 2 is substantially identical to a distance between the second coil core 2 and the third coil core 3, and also substantially identical to a distance between the fourth coil core 4 and the fifth coil core 5, and also substantially identical to a distance between the fifth coil core 5 and the sixth coil core. The distances of the individual coil cores 1, 2, 3, 4, 5, 6 to each other are therefore preferably identical.

Further preferably it is provided that the first coil core 1 is arranged symmetrical relative to the fourth coil core 4 with respect to the first yoke part 18 and/or the second yoke part 21. Preferably, as shown in FIG. 1 and also in FIGS. 3 to 8, a layout is preferred which is substantially symmetrical, wherein a corresponding not shown symmetry axis extends through the first or second yoke part 18, 21 which are respectively configured as identical cube. The symmetrical construction enables a simple construction regarding its magnetic properties.

As explained above the symmetric arrangement of the coil cores 1, 2, 3, 4, 5, 6 or the arrangement with respective identical distances to each other enables a simple construction with magnetic properties that can be easily managed. Independent of the construction also a different construction can be provided wherein it is provided that the coil cores 1, 2, 3, 4, 5, 6 are arranged about the yoke parts 18, 21 so that a magnetic length between the first coil core 1 and the fourth coil core 4 is substantially identical to a magnetic length between the second coil core 2 and the fifth coil core 5 and also identical to a magnetic length between the third coil core 3 and the sixth coil core 6. This is the case in the described preferred embodiments.

Hereby it is further preferably provided that the coil cores 1, 2, 3, 4, 5, 6 are arranged about the yoke parts 18, 21 so that a magnetic length between the first coil core 1 and the second coil core 2 is substantially identical to a magnetic length between the first coil core 1 and the fifth coil core 5. This correspondingly applies preferably also to the magnetic lengths of the further neighboring coil cores 1, 2, 3, 4, 5, 6 and has the goal of a symmetric construction with regard to the magnetic properties. In the case of substantially homogenous material properties a geometrically symmetric construction will be identical with a construction that has symmetrical magnetic properties. In the case of yoke parts 18, 21, 26, 27 with homogenous material properties different magnetic properties can be compensated by changing the position of individual coil cores 1, 2, 3, 4, 5, 6 with respect to the position of the other coil cores 1, 2, 3, 4, 5, 6.

FIG. 3 shows a first embodiment of a present coil arrangement 13. The coil cores 1, 2, 3, 4, 5, 6 are hereby respectively configured as cubes, as are the two yoke parts 18, 20, which are arranged parallel to each other. Further assemblies which hold the yoke parts 18, 21 or the coil cores 1, 2, 3, 4, 5, 6 at their shown positions are not shown in FIG. 3 and the further FIGS. 4 to 9. Such mechanical assemblies or means are provided and are known per se. The longitudinal extent 25 of the coil cores 1, 2, 3, 4, 5, 6 is respectively arranged substantially at a right angle to the longitudinal extent of the yoke parts 18, 21. The coil windings 7, 8, 9, 10, 11, 12 are only indicated stylistically by their outline as well as by the first and the second connections 48, 49. Between the coil cores 1, 2, 3, 4, 5, 6 and the yoke parts 18, 21 insulating material plates 24 are arranged as it is known for ensuring a so called air gap.

Figure 4:
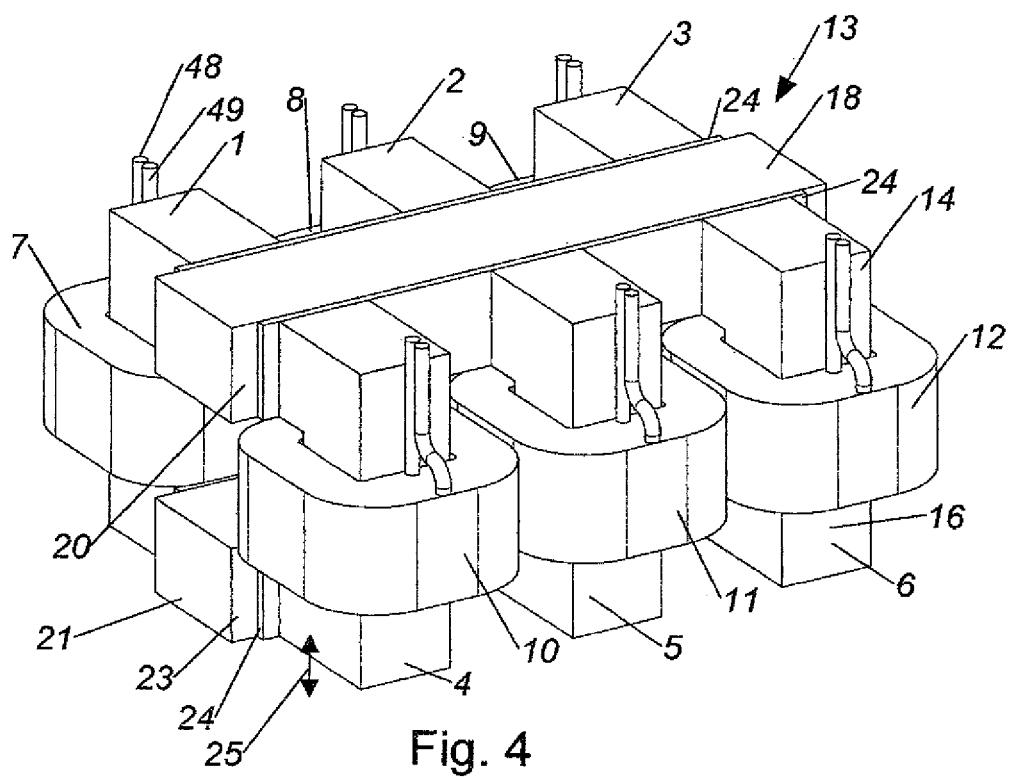
FIG. 4 a second embodiment of a coil arrangement according to the invention with six coils in axonometric representation.

FIG. 4 shows a second embodiment of a present coil arrangement 13 wherein the coil cores 1, 2, 3, 4, 5, 6 are configured as a C-leg.

Figure 5:
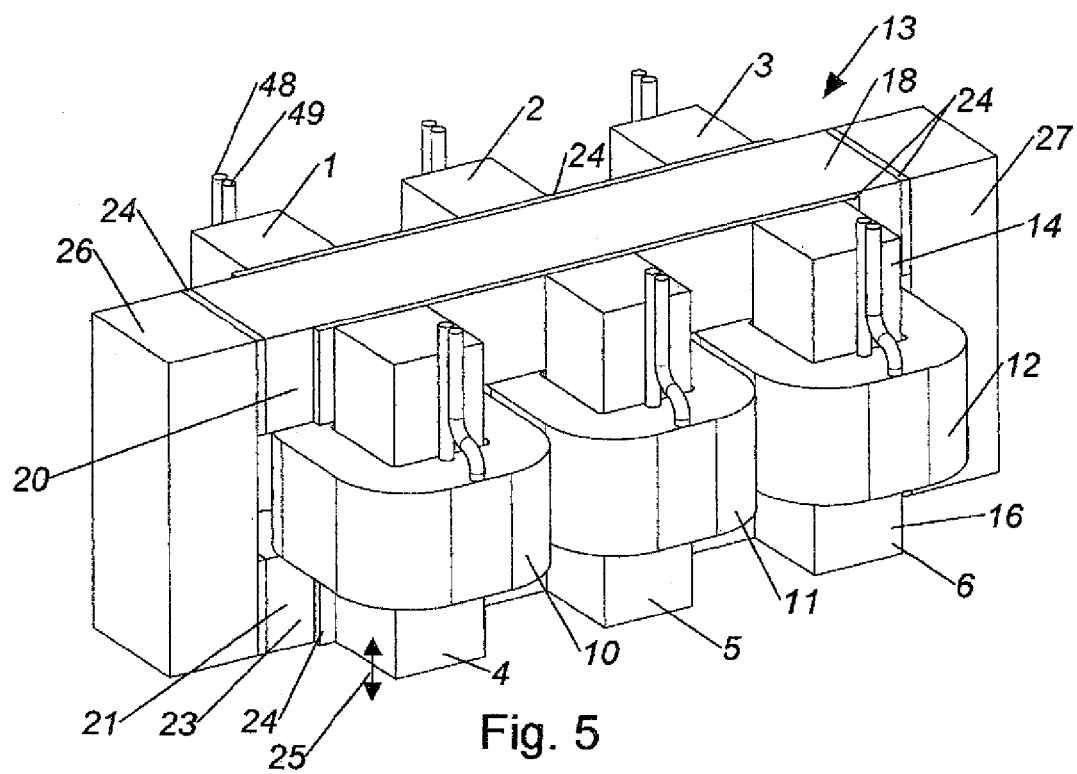
FIG. 5 a third embodiment of a coil arrangement according to the invention with six coils in axonometric representation.
Figure 6:
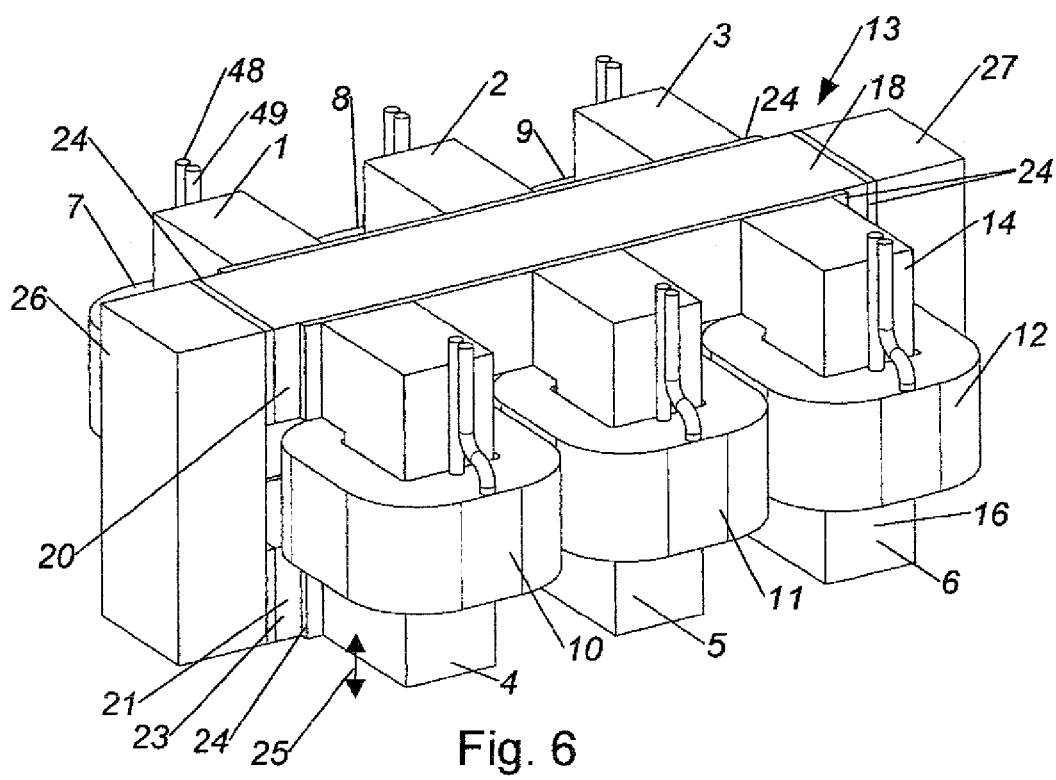
FIG. 6 a fourth embodiment of a coil arrangement according to the invention with six coils in axonometric representation.

FIGS. 5 and 6 show a third or respectively fourth embodiment of a present coil arrangement 13; wherein these are refinements of the first or second embodiment according to FIG. 1 or 2. The first and second yoke part 18, 21 are magnetically connected or coupled by a third yoke part 26 and a fourth yoke part 27, which are configured as I-legs. Between the first and the second yoke parts 18, 21 and the third and the fourth yoke parts 26, 27 respective insulating material plates 24 are arranged.

Figure 7:
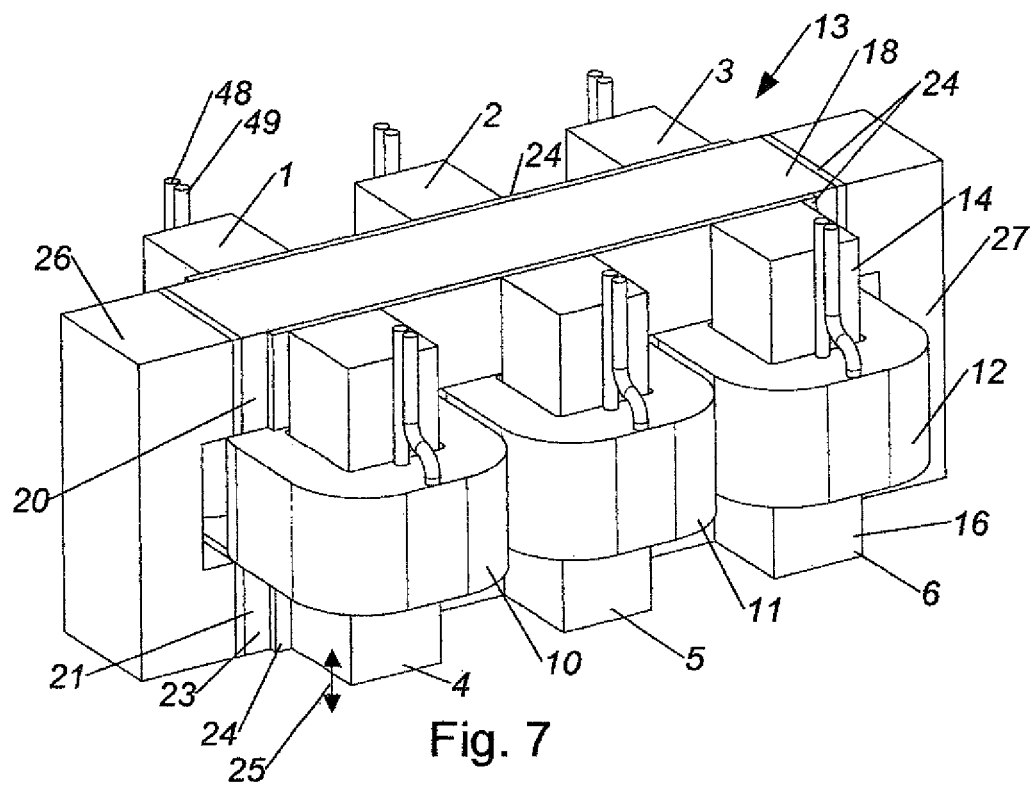
FIG. 7 a fifth embodiment of a coil arrangement according to the invention with six coils in axonometric representation.
Figure 8:
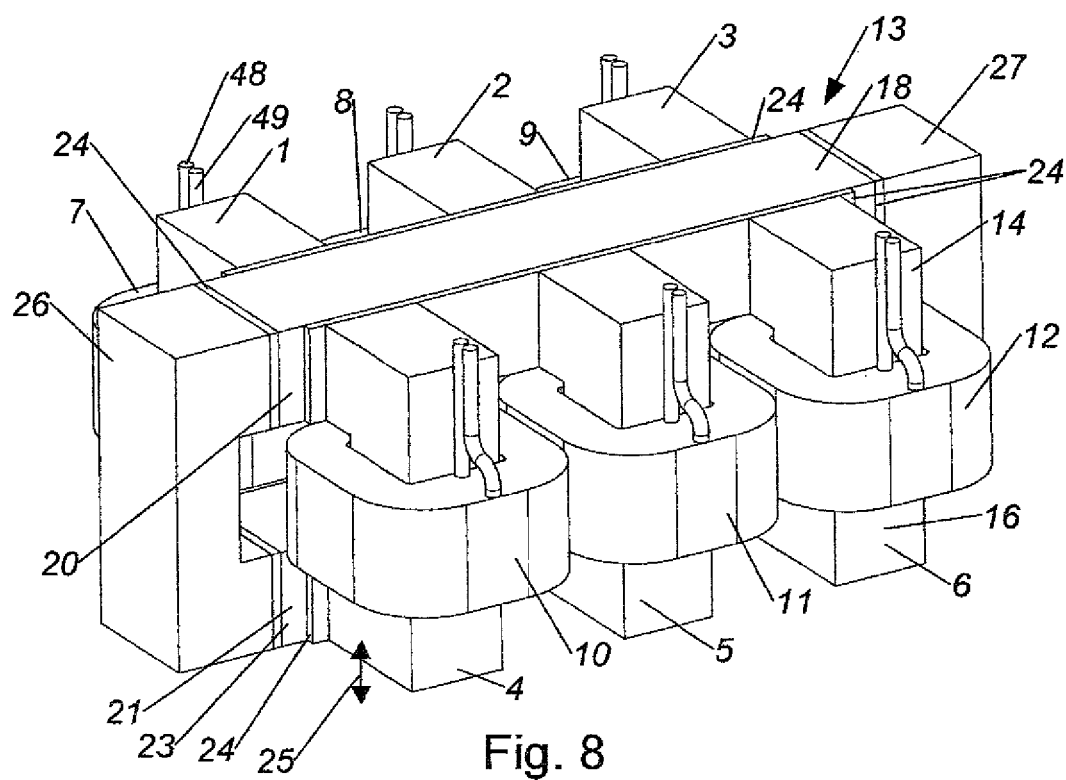
FIG. 8 a sixth embodiment of a coil arrangement according to the invention with six coils in axonometric representation.

FIGS. 7 and 8 show a fifth or sixth embodiment of a present coil arrangement 13, wherein compared to the embodiments according to FIG. 5 or 6 the third and fourth yoke part 26, 27 are configured as C-leg.

In the fourth and the sixth preferred embodiment of a present coil arrangement 13 according to FIGS. 6 and 8 it is additionally provided that the coil cores 1, 2, 3, 4, 5, 6 are configured as C-legs.

As a result of the different configuration of the coil cores 1, 2, 3, 4, 5, 6 and optionally the coupling of the yoke parts 18, 21, 26, 27 the coil arrangement 13 can be adjusted to different demands.

Preferably it is provided that at least one of the six coil cores 1, 2, 3, 4, 5, 6 is arranged displaceable in the direction of the air gap and/or the insulating material plate 24. This enables a simple adjustment of the magnetic coupling. The respective coil cores 1, 2, 3, 4, 5, 6 is/are hereby supported in a corresponding adjustment device, which enables a longitudinal displacement. Such an adjustment device can be configured to include for example a linear guide and a threaded actuating drive, wherein also other implementations are possible. For example an automated adjustment device can be provided, which is driven by the control unit 39 or an external interface and performs the corresponding actuation processes by means of an actuating motor.

In addition or as an alternative it is preferably provided that at least one of the six coil cores 1, 2, 3, 4, 5, 6 is arranged so as to be displaceable in the direction of its longitudinal extent 25. Hereby it can be provided that the coil core 1, 2, 3, 4, 5, 6 is arranged to be displaceable together with the coil winding 7, 8, 9, 10, 11, 12 arranged on the coil core, or that only the coil core 1, 2, 3, 4, 5, 6 is displaceable itself. The implementation of a corresponding adjustment device can be analogous to the description above.

In addition or as an alternative to at least one of the two adjustment possibilities described above it can further be provided that at least one of the six coil cores 1, 2, 3, 4, 5, 6 is arranged for displacement transverse to its longitudinal extent 25 in the direction of the neighboring coil core 1, 2, 3, 4, 5, 6, which provides a further possibility of a simple adjustment.

The three possibilities described above to mechanically adjust a present coil arrangement 13 can be used individually or in combination and enable an adjustment of the corresponding coil arrangement 13 within a wide range. The corresponding adjustment regions are hereby significantly greater than in known coil arrangements in which the coil cores are arranged between planar-parallel yoke surfaces and in which changes have to be performed at a space that is hard to access, and in addition the influence of the other coils is significantly higher.

The present adjustment types also have the advantage that the at least one corresponding adjustment device can be easily arranged because space is present around the coil arrangement 13 and it is not required to access the space inside the yoke parts 18, 21, 26, 27 for the adjustment or to have to perform small adjustments at mechanical components at this difficult-to-access region. The corresponding assemblies of an adjustment device can be arranged about the coil arrangement 13, which makes it easy to configure the assemblies so that the assemblies continue to be easily accessible even after the coil arrangement 13 has been mounted in a housing of an electric device 30 and enable a later adjustment or a re-adjustment.

A particularly preferred field of application of a present coil arrangement 13 are electrical devices 30 which have switchable half-bridges 33, 34, 35, 36, 37, 38 and which are for example referred to as switching regulator or also as inverter.

FIG. 2 shows a schematic diagram of an electric device 30 with a direct current connection 31 with a switching arrangement 32 including a first switchable half-bridge 33, a second switchable half-bridge 34, a third switchable half-bridge 35 a fourth switchable half-bridge 36 a fifth switchable half-bridge 37 and a sixth switchable half-bridge 38 which half-bridges 33, 34, 35, 36, 37, 38 each are connected between two conductors which are each connected with a pole of the direct current connection 31.

Not shown is a ground connection. Preferably it is provided that an electric mass of the electric device 30 is positioned potential-symmetric between the two conductors of the direct current connection 31 in order to achieve a symmetrical electrical construction and an essentially direct-current-free output.

Each of the half-bridges 33, 34, 35, 36, 37, 38 has two switches 40 which can also be referred to as variable resistors, and which are each preferably configured as a pairing of an IGBT and a freewheeling diode, wherein also differently configured semiconductor elements can be provided.

Each of the 33, 34, 35, 36, 37, 38 has between the two switches 40 an output 41, 42, 43, 44, 45, 46 which is each connected with one of the coil windings 7, 8, 9, 10, 11, 12 of a present coil arrangement 13. Therefore preferably the first output 41 of the first half-bridge 33 is connected with the first coil winding 7, the second output of the second half-bridge 34 with the second coil winding 8, the third output 43 of the third half-bridge 35 with the third coil winding 9, the fourth output 44 of the fourth half-bridge 36 with the fourth coil winging 10 the fifth output 45 of the fifth half-bridge 37 with the fifth coil winding 11 and the sixth output 46 of the sixth half-bridge 38 with the sixth coil winding 12.

The outputs 41, 42, 43, 44, 45, 46 of the half-bridges 33, 34, 35, 36, 37, 38 are hereby respectively connected with a first connection 48 of the coil windings 7, 8, 9, 10, 11, 12. The second connections 49 of all coil windings 7, 8, 9, 10, 11, 12 are also connected with each other and are further connected with an alternating current connection 50 of the electric device 30 or form the corresponding alternating current connection 50.

Also embodiments of a present electric device 30 with a higher or a lower number of switchable half-bridges 33, 34, 35, 36, 37, 38 can be provided. Hereby it is respectively provided that the number of the switchable half-bridges 33, 34, 35, 36, 37, 38 is identical with the number of the coil windings 7, 8, 9, 10, 11, 12 of the coil arrangement 13. Further, preferably an even number of switchable half-bridges 33, 34, 35, 36, 37, 38 and coil windings 7, 8, 9, 10, 11, 12 is provided. The present embodiments of such a device 30 with six half-bridges 33, 34, 35, 36, 37, 38 is particularly preferred and has proven advantageous with regard to the practical implementation.

The electric device 30 further has a control unit 39, which is connected with the switches 40 of the individual half-bridges 33, 34, 35, 36, 37, 38 and which control unit is configured to switch or correspondingly control the switches 40 of the half-bridges 33, 34, 35, 36, 37, 38 with a predeterminable phase angle relative to each other.

The control unit 39 is preferably configured go include a microprocessor or microcontroller and/or a programmable logic circuit. Hereby it can be provided to achieve the preferred control described below of the individual coil windings 7, 8, 9, 10, 11, 12 of the present coil arrangement 13 by corresponding programming of a microprocessor or microcontroller or by a complete hardware solution.

In such electric devices 30 or inverters the problem arises that at the alternating current output 50 an alternating current signal is to be present which only has to have a low residual ripple. The switches 40 of the half-bridges 33, 34, 35, 36, 37, 38 are typically clocked with a switching frequency in the kilohertz range. Preferably it is provided to switch the half-bridges 33, 34, 35, 36, 37, 38 with a switching frequency in the range between 10 kHz and 50 kHz, preferably in a range around 20 kHz. The signal that thus consists of different phase shifted parts is switched in the coil arrangement 13 and assembled to a signal. Hereby however due to the construction of the coil arrangement 13 which deviates from a theoretically ideal, but practically hardly realizable, star-shaped construction, it cannot be prevented that due to the different magnetic lengths between some coil cores 1, 2, 3, 4, 5, 6 an interfering signal results which has the switching frequency or multiples of the switching frequency and superimposes the used signal. Correspondingly it is common to connect the alternating current output 50 to a—not shown—low pass filter in order to filter the interfering signal.

A strong interfering signal, i.e., an interfering signal with great amplitude, has significant disadvantages for the entire electric device, in particular for the implementation of the coil arrangement 13. A strong interfering signal requires great cross sections of the coil cores or the yoke parts in order to prevent that these interfering signals due to the direct current portion are driven into saturation. As a result the overall construction is enlarged. In addition the magnet materials are a great cost factor and also pose an increasing problem for the environment due to the increasing rarity of certain materials. In addition it is required to arrange a correspondingly large-dimensioned low pass filter on the alternating current output 50. Such a filter not only requires a large amount of space due to the large capacitors which also may cause significant electromechanical problems due to parasitic inductivities and leakage currents, but also has a high time constant which significantly slows down the entire electric device regarding the time behavior, or has a low slew rate which as a consequence also results in the fact that also the upper limit frequency of such a known device is low which in turn significantly reduces the versatility of such a device.

It has been shown that the type of the control of the individual coil windings 7, 8, 9, 10, 11, 12 of the coil arrangement 13, i.e. which one of the coil windings 7, 8, 9, 10, 11, 12 is controlled with which phase angle relative to the other coil windings 7, 8, 9, 10, 11, 12, has a strong influence on the level, i.e., the amplitude, of the interfering signal. By controlling the switches 40 of the individual switching bridges 33, 34, 35, 36, 37, 38 and thus the individual coil windings 7, 8, 9, 10, 11, 12 in a particular way the height or amplitude of the interfering signal can be significantly reduced. Corresponding tests have resulted in a reduction of the interfering signal by a factor of ten to twenty.

With respect to the general construction of the present coil arrangement 13, as schematically shown in FIG. 1, three groups of control possibilities were found which have proven advantageous compared to the great number of possible controls.

As a result of the control of the individual coil windings 7, 8, 9, 10, 11, 12 described below, the amplitude of the interfering signal can be minimized for present geometric construction. As a result the cross sections of the coil cores 1, 2, 3, 4, 5, 6 and the yoke parts 18, 21, 26, 27 can be kept small. As a result the mass of the coil arrangement 13 can be kept small and also the costs of high-quality magnet materials. As a result of the low amplitude of the interfering signal the low pass filter at the alternating current output 50 can be dimensioned small, wherein a filter with a low time constant can be used. As a result of the low amplitude of the interfering signal a slew rate and with this a high upper limit frequency can be achieved, which opens up completely new fields of application for a thusly-configured present electric device 30. In tests an upper limit frequency of 10 kHz could be achieved, with outputted powers in the two-figure kilowatt range.

It is noted that the described types of control of the individual coil windings relate to a coil arrangement 13 in which the individual coil cores 1, 2, 3, 4, 5, 6, with the coil windings 7, 8, 9, 10, 11, 12 respectively assigned thereto, have all substantially identical inductivities. Preferably it is hereby provided that the differences between the corresponding inductivities are not greater than 5%. In praxis the corresponding coil arrangement 13 is preferably adjusted by the preferably provided adjustment device. The adjustment therefore is accomplished on the coil arrangement 13, wherein it is preferably provided that the electrical parameters, in particular an inductivity or current and voltage of the arrangement of coil winding 7, 8, 9, 10, 11, 12 and coil core 1, 2, 3, 4, 5, 6 is respectively measured, which is adjusted. Hereby different methods of adjustment can be provided. Preferably the corresponding coil winding 7, 8, 9, 10, 11, 12 to be adjusted is switched into a measuring bridge.

The types of the control described below respectively describe relative phase angles of the individual switching bridges 33, 34, 35, 36, 37, 38 relative to each other, which as explained above are connected with defined coil windings 7, 8, 9, 10, 11, 12. For better clarity a respective table with the different relative phase angles is shown. Hereby the respective phase angle of the first switching bridge 33 is designated 0°. Because the statements however relate to relative phase angles the value 0° can be assigned to any of the switching bridges 33, 34, 35, 36, 37, 38.

According to a first type of the control it is provided that the control nit 39 is configured to control the switches 40 of the fourth switching bridge 36 with a phase shift of substantially 180° relative to the switches 40 of the first switching bridge 33, to control the switches 40 of the second switching bridge 34 with a phase shift of substantially 180° relative to the switches 40 of the fifth switching bridge 37, to control the switches 40 of the third switching bridge 35 with a phase shift of substantially 180° relative to the switches 40 of the sixth switching bridge 38, to control the switches 40 of the second switching bridge 34 or the fifth switching bridge 37 by 60° relative to the switches 40 of the first switching bridge 33 and to control the switches 40 of the third switching bridge 35 or the sixth switching bridge 38 by 120° relative to the switches of the first switching bridge 33.

The described first types of control are summarized in Table 1. In this table and in the further tables the switching bridge with reference sign is entered into the columns. In addition the reference signs of the corresponding coil cores assigned to the corresponding switching bridges 33, 34, 35, 36, 37, 38 are entered in order to enable easy assignment of the corresponding control angles in FIG. 1.

TABLE 1

| Switching bridge | (33) | (36) | (34) | (37) | (35) | (38) |
| Coil core | (1) | (4) | (2) | (5) | (3) | (6) |
|---|---|---|---|---|---|---|
| | 0° | 180° | 60 | 240° | 120° | 300 |
| | 0° | 180° | 60° | 240° | 300° | 120° |
| | 0° | 180° | 240° | 60° | 120° | 300° |
| | 0° | 180° | 240° | 60° | 300° | 120° |

According to a second type of control it is provided that the control unit 3 is configured to control the switches 40 of the fourth switching bridge 36 with a phase shift of substantially 60° relative to the switches 40 of the first switching bridge 33, to control the switches 40 of the second switching bridge 34 with a phase shift of substantially 180° relative to the switches 40 of the fifth switching bridge 37, to control the switches 40 of the third switching bridge 35 with a phase shift of substantially 60° relative to the switches 40 of the sixth switching bridge 38, to control the switches 40 of the second switching bridge 34 or the fifth switching bridge 37 by 120° relative to the switches 40 of the first switching bridge 33, and to control the switches 40 of the third switching bridge 35 or the sixth switching bridge 38 by 180° relative to the switches 40 of the first switching bridge (33).

The described second types of control are summarized in Table 2.

TABLE 2

| Switching bridge | (33) | (36) | (34) | (37) | (35) | (38) |
| Coil core | (1) | (4) | (2) | (5) | (3) | (6) |
|---|---|---|---|---|---|---|
| | 0° | 60° | 120° | 300° | 240° | 180° |
| | 0° | 60° | 120° | 300° | 180° | 240° |
| | 0° | 60° | 300° | 120° | 240° | 180° |
| | 0° | 60° | 300° | 120° | 180° | 240 |

According to a third type of control it is provided that the control unit 39 is configured to control the switches 40 of the fourth switching bridge 36 with a phase shift of substantially 120° relative to the switches 40 of the first switching bridge 33, to control the switches 40 of the second switching bridge 34 with a phase shift of substantially 180° relative to the switches 40 of the fifth switching bridge 37, to control the switches 40 of the third switching bridge 35 with a phase shift of substantially 120° relative to the switches 40 of the sixth switching bridge 38, to control the switches 40 of the second switching bridge 34 of the fifth switching bridge 37 by 60° relative to the switches 40 of the first switching bridge 33, and to control the switches 40 of the third switching bridge 35 or the sixth switching bridge 38 by 16° relative to the switches 40 of the first switching bridge 33.

The described second types of the control are summarized in Table 3.

TABLE 3

| Switching bridge | (33) | (36) | (34) | (37) | (35) | (38) |
|---|---|---|---|---|---|---|
| Coil core | (1) | (4) | (2) | (5) | (3) | (6) |
| | 0° | 120° | 60° | 240° | 180° | 300° |
| | 0° | 120° | 60° | 240° | 300° | 180° |
| | 0° | 120° | 240° | 60° | 180° | 300° |
| | 0° | 120° | 240° | 60° | 300° | 180° |

According to a method for controlling a present coil arrangement 13 by means of clocked half-bridges 33, 334, 35, 36, 37, 38, wherein a respective half-bridge 33, 34, 35, 36, 37, 38 are arranged with one of the coil windings 7, 8, 9, 10, 11, 12 and the coil windings are arranged corresponding to the coil cores 1, 2, 3, 4, 5, 6 assigned to them according to FIG. 1 it is provided that the fourth coil winding 7 is controlled with a phase shift of substantially 180° relative to the first coil winding 7, the second coil winding 8 is controlled with a phase shift of substantially 180° relative to the fifth coil winding 11, the third coil winding 9 is controlled with a phase shift of substantially 180° relative to the sixth coil winding 12, the second coil winding 8 or the fifth coil winding 11 is controlled with a phase shift of substantially 60° relative to the first coil winding 7, and the third coil winding 9 or the sixth coil winding 12 is controlled with a phase shift of 120° relative to the first coil winding 7, or that the fourth coil winding 10 is controlled with a phase shift of substantially 60° relative to the first coil winding 7, the second coil winding 8 is controlled with a phase shift of substantially 180° relative to the fifth coil winding 11, the third coil winding 9 is controlled with a phase shift of substantially 60° relative to the sixth coil winding 12, the second coil winding 8 or the fifth coil winding 11 is controlled with a phase shift of substantially 120° relative to the first coil winding 7 and the third coil winding 9 or the sixth coil winding 12 is controlled with a phase shift of substantially 180° relative to the first coil winding 7, or that the fourth coil winding 10 is controlled with a phase shift of substantially 120° relative to the first coil winding 7, the second coil winding 8 is controlled with a phase shift of substantially 180° relative to the fifth coil winding 11, the third coil winding 9 is controlled with a phase shift of substantially 120° relative to the sixth coil winding 12, the second coil winding 8 or the fifth coil winding 11 is controlled by 60° relative to the first coil winding 7, and the third coil winding 9 or the sixth coil winding 12 is controlled by 180° relative to the first coil winding 7.

As a result of the present measures for controlling the individual coil windings 7, 8, 9, 10, 11, 12 at defined phase angles relative to each other, as mentioned above, a very small interfering signal can be achieved. In a refinement of the invention it can be provided that the control unit 39 has at least one adjustment input 47 and that the control unit 39 is configured for adjustment of the phase angles with which the different half-bridge 33, 34, 35, 36, 37, 38 are controlled. This makes it possible to slightly vary the actual phase angles with which the individual switching bridges 33, 34, 35, 36, 37, 38, or coil windings 7, 8, 9, 10, 11, 12 are operated and to thereby find the respective optimal "working point" for the respective actual construction.

What is claimed is:

1. A coil arrangement, comprising:
    a first coil core about which a first coil winding is arranged;
    a second coil core about which a second coil winding is arranged;
    a fourth coil core about which a fourth coil winding is arranged;
    a fifth coil core about which a fifth coil winding is arranged, wherein the first, second, fourth and fifth coil cores protrude over the first, second, fourth and fifth coil windings respectively with a first coil core end region and a second coil core end region which is different from the first coil core region;
    a first yoke part and a second yoke part, wherein first coil core end region side surfaces of the first coil core end regions of the first coil core and the second coil core are respectively arranged opposite a first yoke side surface of the first yoke part, wherein second coil core end region side surfaces of the second coil core end regions of the first coil core and the second coil core are respectively arranged opposite a first yoke side surface of the second yoke part, wherein first coil core end region side surfaces of the first coil core end regions of the fourth coil core and the fifth coil core are respectively arranged opposite a second yoke side surface of the first yoke part, which are different from the first yoke side surface, and wherein second coil core end region side surfaces of the second coil core end regions of the fourth coil core and the fifth coil core are respectively arranged opposite a second yoke side surface of the second yoke part, which second yoke side surface is different from the first yoke side surface.

2. The coil arrangement of claim 1, wherein the first yoke side surface of the first yoke part is arranged substantially parallel to the second yoke side surface of the first yoke part and the first yoke side surface of the second yoke part is arranged substantially parallel to the second yoke side surface of the second yoke part.

3. The coil arrangement of claim 2, wherein a respective air gap and/or an insulating material plate is arranged between the first and/or the second coil core end region side surfaces and the first and/or the second yoke side surfaces.

4. The coil arrangement of claim 3, wherein at least one of the first, second, third, fourth, fifth, and sixth coil cores is arranged displaceable in a direction of the air gap and/or the insulating material plate.

5. The coil arrangement of claim 1, wherein the first yoke part and the second yoke part are configured substantially cube-shaped, wherein the first yoke part and the second yoke part are configured substantially identical and are arranged substantially parallel to each other.

6. The coil arrangement of claim 1, further comprising a third coil core and a sixth coil core, wherein about the third coil core a third coil winding is arranged, wherein about the sixth coil core a sixth coil winding is arranged, wherein the third and the sixth coil core protrude over the third or the sixth coil winding respectively with a first coil core end region and a second coil core end region which is different from the first coil core end region, wherein a first coil core end region side surface of the first coil core end region of the third coil core is arranged opposite the first yoke side surface of the first yoke part, wherein a second coil core end region side surface of the second coil core end region of the third coil core is arranged opposite the first yoke side surface of the second yoke part, wherein a first coil core end region side surface of the first coil core end region of the sixth coil core is arranged opposite the second yoke side surface of the first yoke part, and wherein a second coil core end region side surface of the second coil core end region of the sixth coil core is arranged opposite the second yoke side surface of the second yoke part.

7. The coil arrangement of claim 6, wherein the first, second and third coil cores are arranged in a first row, wherein the second coil core is arranged between the first coil core and the third coil core, and the fourth, fifth and sixth coil core are arranged in a second row, wherein the fourth coil core is arranged opposite the first coil core and the fifth coil core is arranged between the fourth coil core and the sixth coil core.

8. The coil arrangement of claim 6, wherein a distance between the first coil core and the second coil core is essentially identical to a distance between the second coil core and the third coil core, and further essentially identical to a distance between the fourth coil core and the fifth coil core, and to a distance between the fifth coil core and the sixth coil core.

9. The coil arrangement of claim 8, wherein the first coil core is arranged symmetrical relative to the fourth coil core with respect to the first yoke part and/or the second yoke part.

10. The coil arrangement of claim 6, wherein the first, second, third, fourth, fifth and sixth coil cores are arranged about the first and second yoke parts so that a magnetic length between the first coil core and the fourth coil core is substantially identical to a magnetic length between the second coil core and the fifth coil core and is further identical to a magnetic length between the third coil core and the sixth coil core.

11. The coil arrangement of claim 1, wherein the first, second, fourth and fifth coil cores are arranged about the yoke parts so that a magnetic length between the first coil core and the second coil core is substantially identical to a magnetic length between the first coil core and the fifth coil core.

12. The coil arrangement of claim 1, wherein at least one of the coil cores the first, second, third, fourth, fifth, and sixth coil cores is arranged displaceable in a direction of its longitudinal extent.

13. The coil arrangement of claim 1, wherein at least one of the coil cores the first, second, third, fourth, fifth, and sixth coil cores is arranged displaceable in a direction transverse to its longitudinal extent.

14. An electric device, comprising:
a direct current connection,
a switching arrangement including a first, second, third, fourth, fifth and sixth switchable half-bridge, each said first, second third, fourth fifth and sixth switchable half-bridge being connected with the direct current connection and having respective switches;
a control unit connected with respective switches of the half-bridges, said control unit being configured to switch the respective switches of the half-bridges with a predeterminable phase angle relative to each other;
a coil arrangement comprising a first, second, third, fourth, fifth and sixth coil core and a first, second, third, fourth, fifth and sixth coil winding, each said coil winding being arranged about a respective one of said coil cores, wherein the coil cores protrude over the coil windings respectively with a first coil core end region and a second coil core end region which is different from the first coil core region; said coil arrangement further comprising a first yoke part and a second yoke part, wherein first coil core end region side surfaces of the first coil core end regions of the first coil core, the second coil core and the third coil core are respectively arranged opposite a first yoke side surface of the first yoke part, wherein second coil core end region side surfaces of the second coil core end regions of the first coil core, the second coil core and the third coil core are respectively arranged opposite a first yoke side surface of the second yoke part, wherein first coil core end region side surfaces of the first coil core end regions of the fourth coil core, the fifth coil core and the sixth coil core are respectively arranged opposite a second yoke side surface of the first yoke part, which are different from the first yoke side surface, and wherein second coil core end region side surfaces of the second coil core end regions of the fourth coil core, the fifth coil core and the sixth coil core are respectively arranged opposite a second yoke side surface of the second yoke part, which second yoke side surface is different from the first yoke side surface, wherein outputs of the half-bridges are each respectively connected with one of the coil windings of the coil arrangement.

15. The electric device of claim 14, wherein the control unit has at least one adjustment input and is configured for a change of the phase angle with which the different half-bridges are controlled.

16. The electric device of claim 14, wherein the outputs of the half-bridges are each connected with a first connection of the coil windings, and wherein second connections of all said coil windings are connected with each other and with an alternating current connection of the electric device.

17. The electric device of claim 14, wherein the first, second and third coil cores are arranged in a first row, wherein the second coil core is arranged between the first coil core and the third coil core, and the fourth, fifth and sixth coil core are arranged in a second row, wherein the fourth coil core is arranged opposite the first coil core and the fifth coil core is arranged between the fourth coil core and the sixth coil core, wherein the first half-bridge is connected with the first coil winding, wherein the second half-bridge is connected with the second coil winding, the third half-bridge is connected with the third coil winding, the fourth half-bridge is connected with the fourth coil winding, the fifth half-bridge is connected with the fifth coil winding and the sixth half-bridge is connected with the sixth coil winding.

18. The electric device of claim 17, wherein the control unit is configured to control the switches of the fourth half-bridge with a phase shift of substantially 180° relative to the switches of the first half-bridge, to control the switches of the second half-bridge with a phase shift of substantially 180° relative to the switches of the fifth half-bridge, to control the switches of the third half-bridge with a phase shift of substantially 180° relative to the switches of the sixth half-bridge, to control the switches of the second half-bridge or the fifth half-bridge by 60° relative to the switches of the first half-bridge, and to control the switches of the third half-bridge of the sixth half-bridge by 120° relative to the switches of the first half-bridge.

19. The electric device of claim 17, wherein the control unit is configured to control the switches of the fourth half-bridge with a phase shift of substantially 60° relative to the switches of the first half-bridge, to control the switches of the second half-bridge with a phase shift of substantially 180° relative to the switches of the fifth half-bridge, to control the switches of the third half-bridge with a phase shift of substantially 60° relative to the switches of the sixth half-bridge, to control the switches of the second half-bridge or the fifth half-bridge by 120° relative to the switches of the first half-bridge and to control the switches of the third half-bridge or the sixth half-bridge by 180° relative to the switches of the first half-bridge.

20. The electric device of claim 17, wherein the control unit is configured to control the switches of the fourth half-bridge with a phase shift of substantially 120° relative to the switches of the first half-bridge, to control the switches of the second half-bridge with a phase shift of substantially 180° relative to the switches of the fifth half-bridge, to control the switches of the third half-bridge with a phase shift of substantially 120° relative to the switches of the sixth half-bridge, to control the switches of the second half-bridge or the fifth half-bridge by 60° relative to the switches of the first half-bridge, and to control the switches of the third half-bridge or the sixth half-bridge by 180° relative to he switches of the first half-bridge.

21. A method for controlling a coil arrangement, comprising:
   providing the coil arrangement of claim 17;
   controlling the coil arrangement with clocked half-bridges, wherein each of said clocked half-bridges is connected with a respective one of the coil windings, said controlling being performed in one of three ways,
   a first way in which the fourth coil winding is controlled with a phase shift of substantially 180° relative to the first coil winding, the second coil winding is controlled with a phase shift of substantially 180° relative to the fifth coil winding, the third coil winding is controlled with a phase shift of substantially 180° relative to the sixth coil winding, the second coil winding of the fifth coil winding is controlled by 60° relative to the first coil winding and the third coil winding or the sixth coil winding is controlled by 120° relative to the first oil winding,
   a second way in which the fourth coil wining is controlled with a phase shift of substantially 60° relative to the first coil winding, the second coil winding is controlled with a phase shift of substantially 180° relative to the fifth coil winding, the third coil winding is controlled with a phase shift of substantially 60° relative to the sixth coil winding, the second coil winding or the fifth coil winding is controlled by 120° relative to the first coil winding, and the third cool winding or the sixth coil winding is controlled by 180° relative to the first coil widening,
   a third way in which the fourth coil winding is controlled with a phase shift of substantially 120° relative to the first coil winding, the second coil winding is controlled with a phase shift of substantially 180° relative to the fifth coil winding, the third coil winding is controlled with a phase shift of substantially 120° relative to the sixth coil winding, the second coil winding or the fifth coil winding is controlled by 60° relative to the first coil winding and the third coil winding of the sixth coil winding is controlled by 180° relative to the first coil winding.

* * * * *